(12) United States Patent
Coello et al.

(10) Patent No.: US 11,530,762 B2
(45) Date of Patent: Dec. 20, 2022

(54) COUPLING NUT VISIBLE TIGHTNESS INDICATOR

(71) Applicant: The Boeing Company, Chicago, IL (US)

(72) Inventors: Ryan K. Coello, Renton, WA (US); Andrew B. Clements, Maple Valley, WA (US); Ronald L. Clements, Kent, WA (US); David J. Linnenkamp, Renton, WA (US); Christian J. Tom, Kent, WA (US); Christian M. Fedor, San Luis Obispo, CA (US); Donald W. Coffland, Seattle, WA (US)

(73) Assignee: The Boeing Company, Chicago, IL (US)

( * ) Notice: Subject to any disclaimer, the term of this patent is extended or adjusted under 35 U.S.C. 154(b) by 527 days.

(21) Appl. No.: 16/674,819

(22) Filed: Nov. 5, 2019

(65) Prior Publication Data

US 2021/0131590 A1 May 6, 2021

(51) Int. Cl.
*F16L 19/02* (2006.01)
*F16B 31/02* (2006.01)
*F16L 19/065* (2006.01)

(52) U.S. Cl.
CPC .......... *F16L 19/0225* (2013.01); *F16B 31/02* (2013.01); *F16L 19/0206* (2013.01); *F16L 19/0653* (2013.01); *F16L 2201/10* (2013.01)

(58) Field of Classification Search
CPC ............... F16L 19/0653; F16L 19/0206; F16L 19/0225; F16L 2201/10; F16B 1/0071; F16B 31/02; F16B 31/028

USPC ..................................................... 285/93, 354
See application file for complete search history.

(56) References Cited

U.S. PATENT DOCUMENTS

| 10,359,141 | B2 | 7/2019 | Clements et al. | |
|---|---|---|---|---|
| 2008/0193249 | A1* | 8/2008 | Hill | .......................... F16B 31/02 |
| 2008/0286069 | A1* | 11/2008 | Hohmann | ............. F16B 31/028 |
| 2010/0283235 | A1* | 11/2010 | Furst | ................... F16L 19/0653 |
| 2014/0028013 | A1* | 1/2014 | Neiske | ..................... F16L 19/00 |
| 2019/0277715 | A1* | 9/2019 | Robertson | ............... F16B 31/02 |

\* cited by examiner

*Primary Examiner* — Zachary T Dragicevich
(74) *Attorney, Agent, or Firm* — McDonnell Boehnen Hulbert & Berghoff LLP (57) ABSTRACT

A fitting assembly configured to visibly indicate nut tightness when coupling a first component to a second component is disclosed. The fitting assembly comprises a nut comprising a threaded portion and a chamber portion, wherein the chamber portion comprises one or more through-holes. The fitting assembly also comprises an indicator slidably disposed within the chamber portion, a retainer assembly disposed within the chamber portion and configured to interlock with an inner surface of the nut, and a spring disposed within the chamber portion between, and engaging, the indicator and the retainer assembly. The retainer assembly is configured to interface with the spring to retain the spring within the chamber portion. The fitting assembly is configured to receive the first component and the second component such that, when the nut is rotated, a visibility of the indicator through the one or more through-holes changes.

20 Claims, 12 Drawing Sheets

COUPLING NUT VISIBLE TIGHTNESS INDICATOR

FIELD

The present disclosure relates generally to a fitting assembly for coupling two components, and more particularly, to a fitting assembly configured for visibly indicating nut tightness when coupling two components.

BACKGROUND

Existing fittings, such as those used to couple components together at joints in hydraulic systems, are installed and torqued to ensure proper tightness and prevent leakage, but over time, such fittings can become loose. To address this, such fittings are often inspected to determine whether they are in an optimal tight position. In some existing inspection processes, for instance, an inspector (e.g., a mechanic or other individual that initially perform the coupling of the two components using the fitting assembly, or who is tasked with inspecting tightness of the coupling at a future point in time) can manually apply a "torque stripe" (e.g., a marking, such as with paint, putty, paste, or another material) to fittings that are deemed by the inspector to be tightened to a desired degree.

However, existing processes for inspecting the tightness of existing fittings can be inefficient, difficult, and susceptible to human error. For example, the inspector might mis-mark a joint. As another example, the inspector might need to manually search for and manipulate each of such fittings (e.g., attempt to rotate a nut of each fitting) to accurately evaluate the tightness of such fittings. This can be particularly inefficient on aircrafts or in other environments where there are numerous (e.g., hundreds) of such fittings to inspect and/or many or all of such fittings are in hard to reach places.

What is needed is a fitting assembly that is efficient to assemble and install, and that helps reduce the time and difficulty of inspection.

SUMMARY

In an example, a fitting assembly configured to visibly indicate nut tightness when coupling a first component to a second component is described. The fitting assembly comprises a nut comprising a threaded portion and a chamber portion, where the chamber portion comprises one or more through-holes. The fitting assembly also comprises an indicator slidably disposed within the chamber portion. The fitting assembly also comprises a retainer assembly disposed within the chamber portion and configured to interlock with an inner surface of the nut. The fitting assembly also comprises a spring disposed within the chamber portion between, and engaging, the indicator and the retainer assembly. The retainer assembly is configured to interface with the spring to retain the spring within the chamber portion. The fitting assembly is configured to receive the first component and the second component such that, when the nut is rotated, a visibility of the indicator through the one or more through-holes changes.

In another example, a method for coupling a first component to a second component. The method comprises coupling a fitting assembly to the first component. The fitting assembly comprises a nut comprising a threaded portion and a chamber portion, where the chamber portion comprises one or more through-holes. The fitting assembly also comprises an indicator slidably disposed within the chamber portion. The fitting assembly also comprises a retainer assembly disposed within the chamber portion and configured to interlock with an inner surface of the nut. The fitting assembly also comprises a spring disposed within the chamber portion between, and engaging, the indicator and the retainer assembly, where the retainer assembly is configured to interface with the spring to retain the spring within the chamber portion. The method also comprises coupling the nut to the second component such that the second component receives a portion of the first component. The method also comprises rotating the nut such that the threaded portion threadably engages with the second component and until a visibility of the indicator through the one or more through-holes changes.

In another example, a system is described. The system comprises a first component, a second component, and a fitting assembly configured to visibly indicate nut tightness when coupling the first component to the second component. The fitting assembly comprises a nut comprising a threaded portion and a chamber portion, where the chamber portion comprises one or more through-holes. The fitting assembly also comprises an indicator slidably disposed within the chamber portion. The fitting assembly also comprises a retainer assembly disposed within the chamber portion and configured to interlock with an inner surface of the nut. The fitting assembly also comprises a spring disposed within the chamber portion between, and engaging, the indicator and the retainer assembly. The retainer assembly is configured to interface with the spring to retain the spring within the chamber portion. The fitting assembly is configured to receive the first component and the second component such that, when the nut is rotated, a visibility of the indicator through the one or more through-holes changes.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

By the terms "substantially," "about," "approximately," and "proximate" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Unless otherwise specifically noted, elements depicted in the drawings are not necessarily drawn to scale.

Within examples, described herein is a fitting assembly and a method for coupling a first component to a second component using the fitting assembly, particularly where the fitting assembly is designed such that it visibly indicates nut tightness. The disclosed fitting assembly can be used in various contexts, such as hydraulic systems or other systems in aircrafts or other vehicles, or in environments other than vehicles.

The disclosed fitting assembly includes a nut designed to accommodate other components of the fitting assembly, including a retainer assembly, a spring component, and an indicator. The fitting assembly is configured such that, when the fitting assembly is being used to couple a first component to a second component and the nut is rotated (e.g., when the nut's threading engages with a threading of one of the components), rotation of the nut causes a physical displacement of the indicator, which causes a visibility of the indicator to change. The physical displacement of the indicator can result from the indicator being pushed by one of the components, which in turn pushes the indicator against the spring, thereby compressing the spring between the retainer assembly and the indicator.

As an example of how the visibility of the indicator changes, one embodiment of the disclosed fitting assembly can include one or more through-holes through which the indicator can become more visible or less visible as the nut is tightened and the indicator is moved into or out of view. Additionally or alternatively, the indicator can include a portion that protrudes in a direction parallel to the longitudinal axis of the nut and becomes more visible as the nut is tightened. Other examples are possible as well.

Furthermore, the disclosed fitting assembly, the indicator, the nut, etc. of the fitting assembly can be configured (e.g., machined to have certain dimensions) such that the visibility of the indicator accurately represents to an inspector the tightness of the connection between the two components. For example, only when a predefined desired amount of torque is applied to tighten the nut will the indicator no longer be visible through the one or more through-holes. As such, if the inspector sees that the indicator is half visible through the one or more through-holes, the inspector might determine that the nut must be re-tightened. Other example scenarios are possible.

In these and other ways, the disclosed fitting assembly advantageously allows an inspector to more quickly and more easily determine whether a nut is tightened to a desired degree, thereby reducing false positives during inspection and making the inspection process easier and more efficient. For example, the disclosed fitting assembly's built-in indicator of tightness can be easier to notice than other existing mechanisms (e.g., torque stripes), eliminate or reduce the need for existing mechanisms (e.g., applying a torque stripe), and eliminate or reduce the need for an inspector to manually check the tightness of each fitting.

These and other improvements are described in more detail below. Implementations described below are for purposes of example. The implementations described below, as well as other implementations, may provide other improvements as well.

Figure 1:
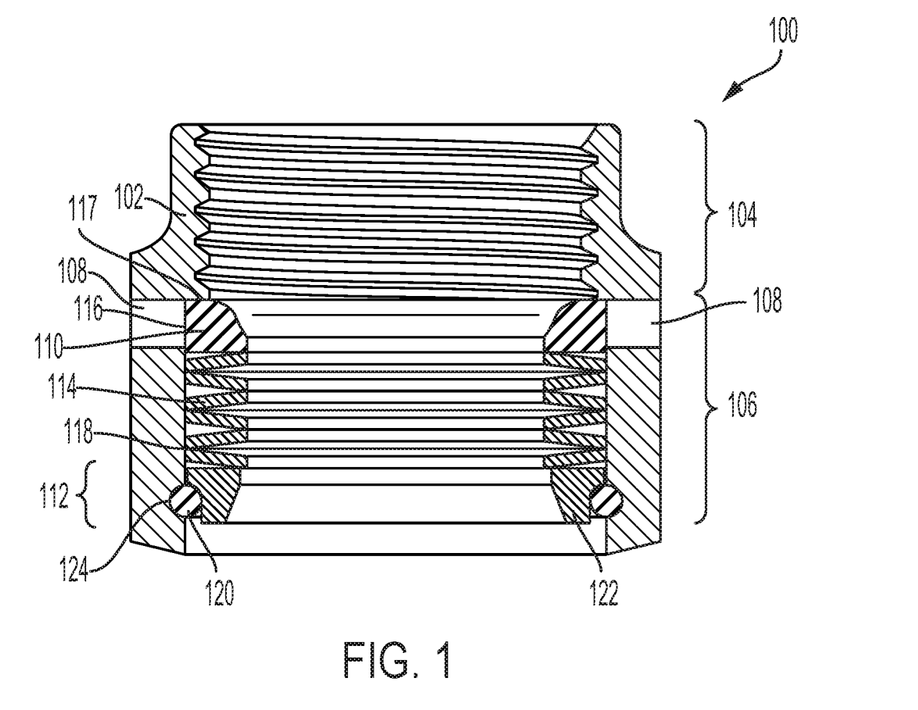
FIG. 1 depicts a cross-sectional view of an example of a fitting assembly, according to an example implementation.

Referring now to the figures, FIG. 1 is a cross-sectional view of an example of a fitting assembly 100. The fitting assembly 100 includes a nut 102 having a threaded portion 104 and a chamber portion 106, where the chamber portion 106 has one or more through-holes 108. The fitting assembly 100 also includes an indicator 110 slidably disposed within the chamber portion 106, a retainer assembly 112 disposed within the chamber portion 106, and a spring 114 disposed within the chamber portion 106 between, and engaging, the indicator 110 and the retainer assembly 112.

The nut 102 can take the form of a typical nut that is designed to accommodate the indicator 110, the retainer assembly 112, and the spring 114. Alternatively, the nut 102 can take the form of another type of threaded fastener. The threaded portion 104 and the chamber portion 106 of the nut 102 can each define a substantially annular space within the nut 102 in some examples, whereas in other examples, the threaded portion 104 might define a substantially annular space and the chamber portion 106 might define a space having a different cylinder (e.g., a non-annular shape, such as rectangular). Other example nuts and shapes are possible as well. In an embodiment where the nut 102 is substantially annular, the indicator 110, the retainer assembly 112, and/or the spring 114 can be made to be substantially annular as well.

As shown, the one or more through-holes 108 are shown as being disposed in the wall of the nut 102 that defines the chamber portion 106—namely, at a location along the length of the chamber portion 106 that borders the threaded portion 104. In alternative embodiments, at least one of the one or more through-holes 108 can be disposed at a different location along the length of the chamber portion 106.

The indicator 110 can take the form of a physical object having dimensions that enable the indicator 110 to be disposed within the chamber portion 106. The indicator 110 can be made of metal (e.g., stainless steel, aluminum, titanium), plastic, and/or another material. Further, the indicator 110 can be configured to appear noticeably distinct from other components in the fitting assembly 100, so that an inspector can more easily determine whether the indicator 110 is visible or not. To facilitate this, for example, the indicator 110 can be arranged within the chamber portion 106 such that at least one surface of the indicator 110, such as surface 116 shown in FIG. 1, can be viewed through the one or more through-holes 108. The surface 116 (and perhaps additionally other surfaces of the indicator 110) can be color-coated, include letters or numbers, or otherwise be made to be noticeable by someone looking through the one or more through-holes 108. In one specific example, the indicator 110 can be made of metal and the surface 116 can be color coated (e.g., with painted dye or another colored material). Additionally or alternatively, the surface 116 can be made of a non-reflective material such that, if an inspector shines a light on the fitting assembly 100, the surface 116 might be more distinguishable from other, more reflective surfaces of other components of the fitting assembly 100. Other examples are possible as well.

As shown, at the border of the chamber portion 106 and the threaded portion 104, the indicator 110 is positioned and held in place between the spring 114 and a ledge 117 that projects towards an interior space of the nut 102.

The retainer assembly 112 is configured to interlock with an inner surface 118 of the nut 102 (e.g., a surface of the wall of the chamber portion 106) and configured to interface with the spring 114 to retain the spring 114 within the chamber portion 106. The retainer assembly 112 can take the form of a single physical object or can include multiple physical objects that engage with each other to facilitate retention of the spring 114. As such, when the spring 114 is compressed during rotation of the nut 102, the indicator 110 moves within the chamber portion 106 without becoming dislodged or moved in an undesirable way. Thus, by extension, the retainer assembly 112 also retains the indicator 110 within the chamber portion 106. The retainer assembly can be made of metal and/or another material.

An example form that the retainer assembly 112 can take is shown in FIG. 1. Specifically, the retainer assembly 112 includes a retaining ring 120 and a retainer 122. In this example, the retaining ring 120 is configured to engage with the retainer 122 and a recess 124 disposed in the inner surface 118 of the nut 102 to retain the retainer 122 within the chamber portion 106. The retainer 122 and the retaining ring 120 thus retain the spring 114 within the chamber portion 106. The retaining ring 120 can be made of carbon steel, stainless steel, copper, and/or another type of material. The retainer 122 can be made of stainless steel and/or another type of material. The retainer assembly 112 can take other forms in alternative embodiments, such as a single snap ring.

The spring 114 can take the form of a compression spring, a plurality of spring washers, or another type of spring configured to compress and withstand the load caused by rotation of the nut 102 in coupling two components.

Figure 2:
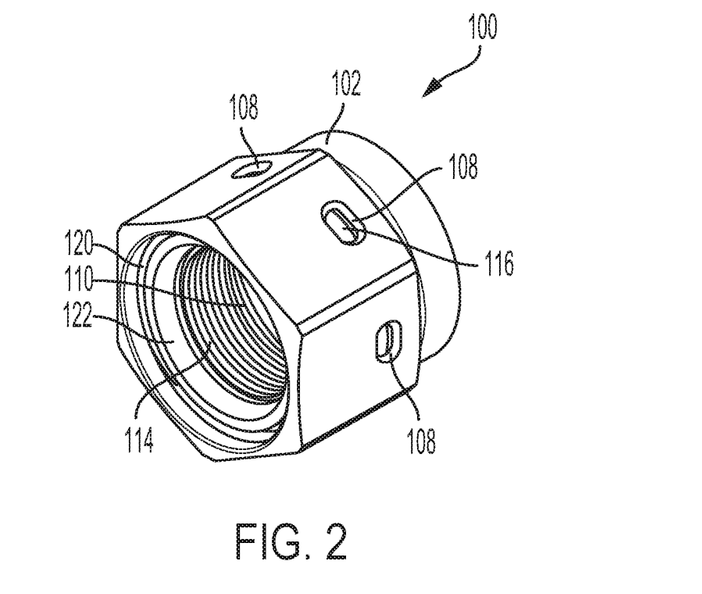
FIG. 2 depicts a perspective view of the fitting assembly of FIG. 1, according to an example implementation.

FIG. 2 depicts a perspective view of the fitting assembly 100. As shown, the nut 102 of fitting assembly 100 has a hexagonal exterior, with a respective one of the one or more through-holes 108 disposed in each of three hexagonal surfaces of the nut 102. As further shown, the surface 116 of the indicator 110 (e.g., a color-coated surface) is visible through each of the three through-holes.

Figure 3:
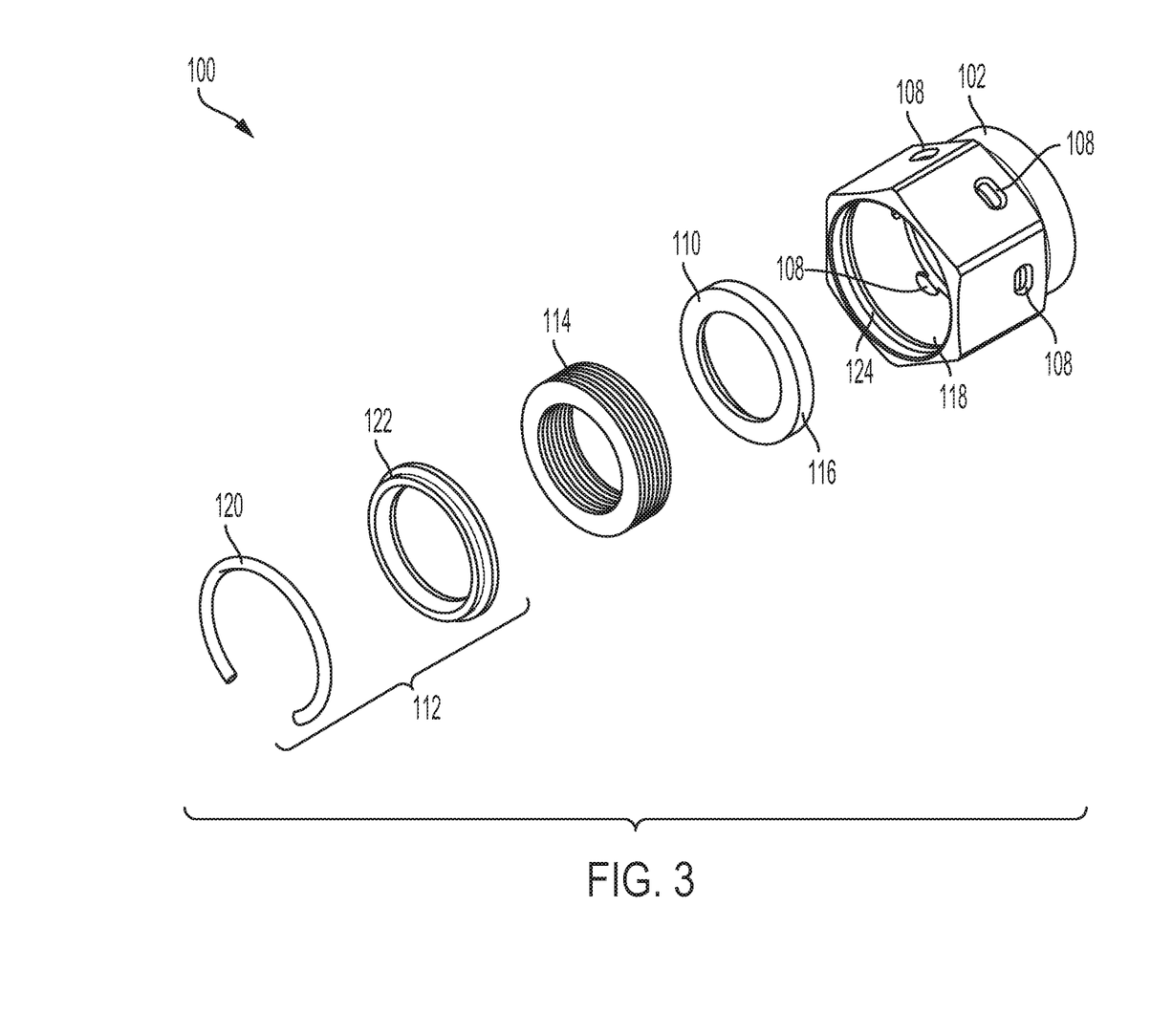
FIG. 3 depicts an exploded view of the fitting assembly of FIG. 1, according to an example implementation.

FIG. 3 depicts an exploded view of the fitting assembly 100, including each of the components described above with respect to FIGS. 1 and 2. As shown in FIGS. 2 and 3, the indicator 110, the retainer assembly 112, the spring 114, and the chamber portion 106 are annular and configured to receive a first of two components. However, as discussed above, one or more of these components of the fitting assembly 100 can have other shapes in alternative examples.

Figure 4:
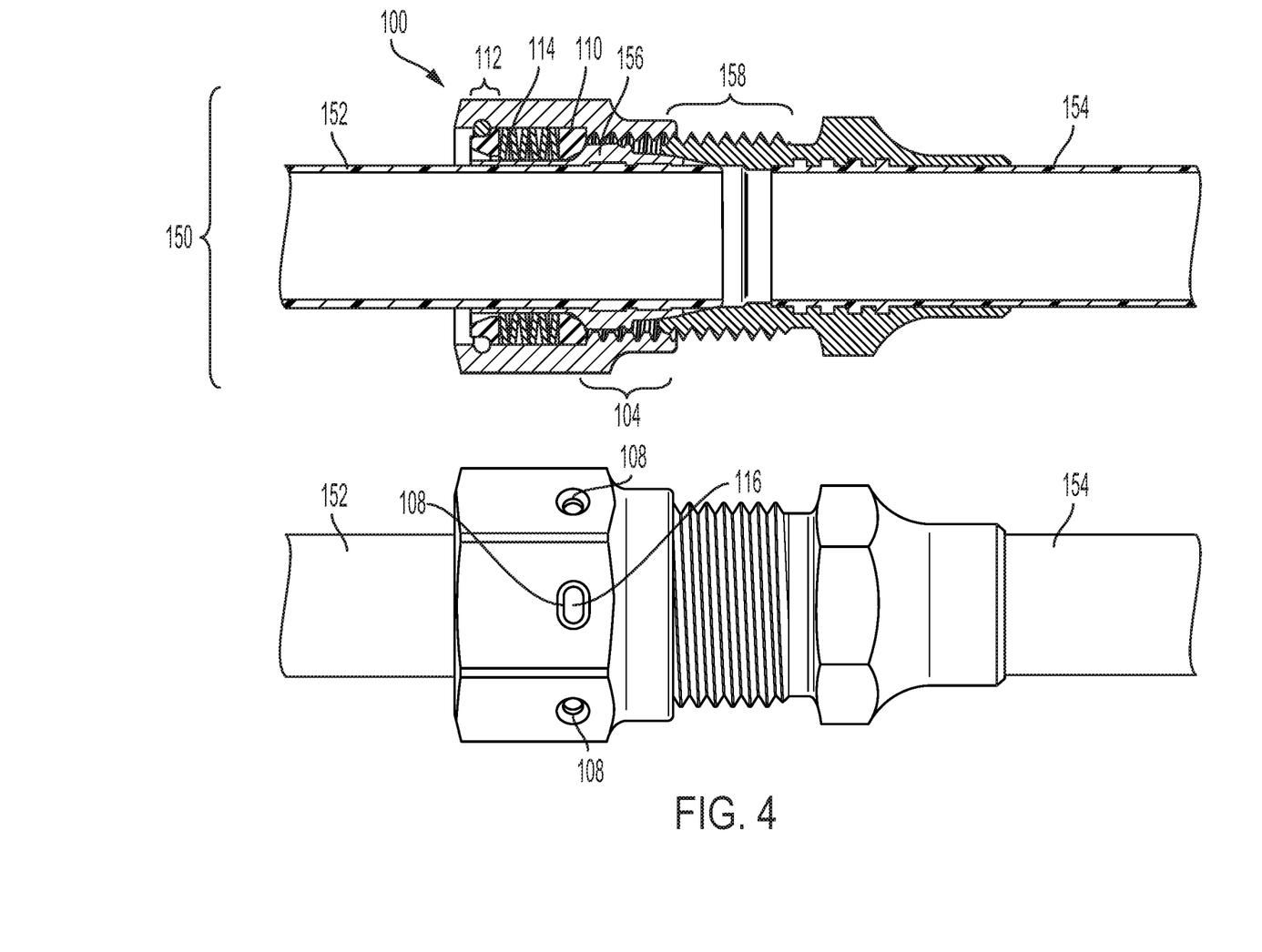
FIG. 4 depicts a side view and cross-sectional side view of the fitting assembly of FIG. 1 being used to couple a first component to a second component, according to an example implementation.
Figure 5:
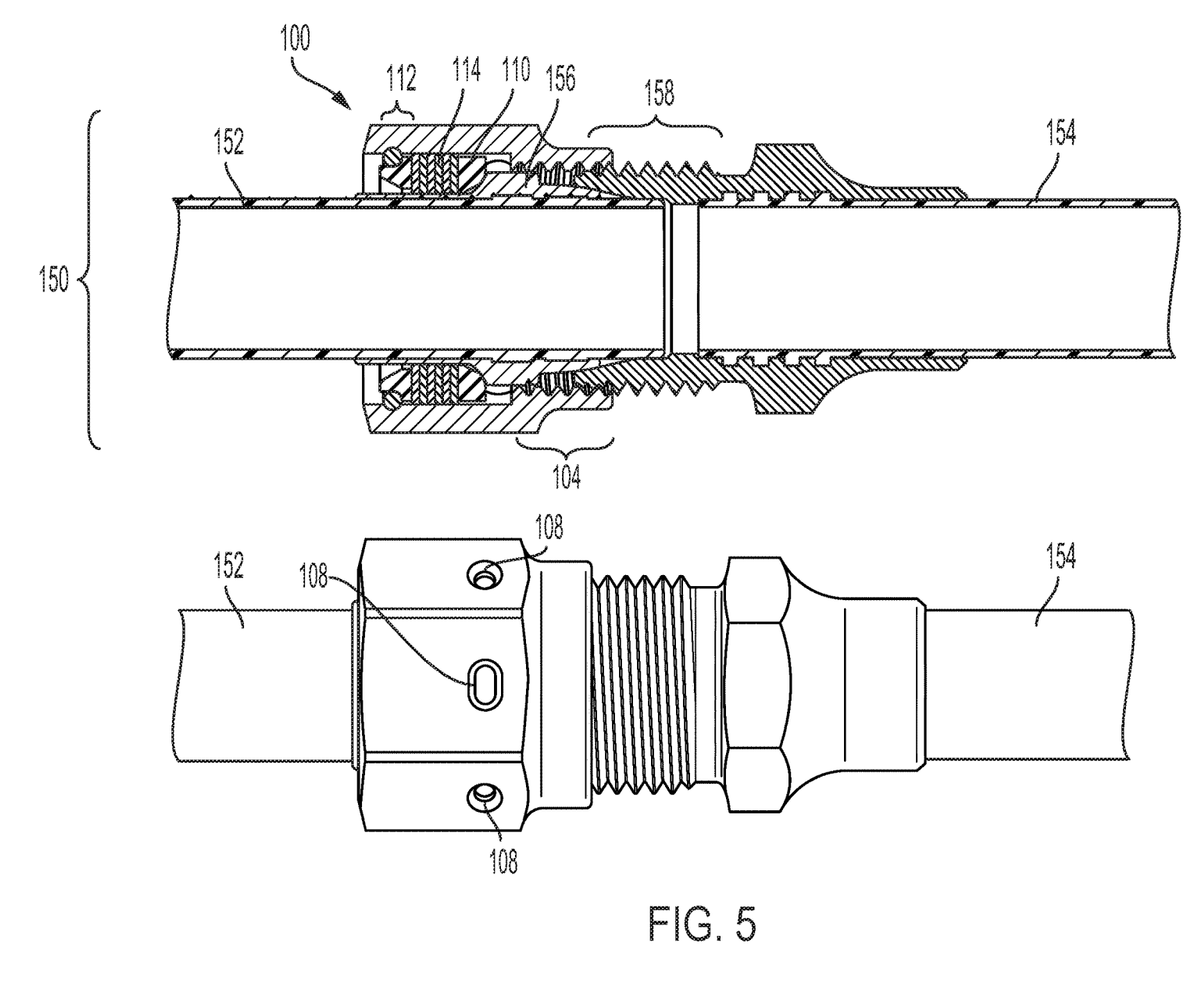
FIG. 5 depicts another side view and another cross-sectional side view of the fitting assembly of FIG. 1 being used to couple a first component to a second component, according to an example implementation.

Next, FIGS. 4 and 5 illustrate an example of a system 150 comprising the fitting assembly 100, a first component 152, and a second component 154. Specifically, FIGS. 4 and 5 illustrate the fitting assembly 100 being used to couple a first component 152 to a second component 154. In the example shown in FIGS. 4 and 5, the first component 152 takes the form of a cylindrical sleeve member having a flange 156 configured to engage with the indicator 110, and the second component 154 takes the form of a cylindrical union having a threaded section 158 configured to threadably engage with the threaded portion 104 of the nut 102 and further configured to receive at least a portion of the first component 152. Specifically, the first component 152 and the second component 154 can be a cylindrical sleeve member and a cylindrical union, respectively, that are each configured for use in carrying fluid in a hydraulic system of a vehicle such as an aircraft. The first component 152 and/or the second component 154 can be made of aluminum, titanium, stainless steel, and/or another type of material. The first component 152 and/or the second component 154 can be flexible or rigid. In alternative examples, the first component 152 and the second component 154 can be configured to carry other types of media and/or the first component 152 and the second component 154 can take other forms.

FIG. 4 depicts a side view and cross-sectional side view of the fitting assembly 100. Specifically, FIG. 4 depicts the fitting assembly 100 before the nut 102 is rotated and tightened to couple the first component 152 to the second component 154.

To facilitate coupling of the first component 152 to the second component 154, the indicator 110 is configured for engagement with, and positioning between, the spring 114 and the flange 156 of the first component 152. Further, the threaded portion 104 of the nut 102 is configured to threadably engage with the threaded section 158 of the second component 154 and to receive at least a portion of the first component 152, as will be described next.

As discussed above, the fitting assembly 100 is configured to receive the first component 152 and the second component 154 such that, when the nut 102 is rotated, a visibility of the indicator 110—namely, a visibility of surface 116 (e.g., a color-coated surface of the indicator 110)—through the one or more through-holes 108 changes. In the example shown in FIGS. 4 and 5, the one or more through-holes 108 take the form of a plurality of through-holes with each hexagonal surface of the nut 102 having a respective one of the plurality of through-holes, and the fitting assembly 100 is configured such that, when the nut 102 is rotated, the indicator 110 will become less visible through each of the plurality of through-holes. An advantage of having a plurality of through-holes such as this, as well as having the indicator 110 be annular-shaped (e.g., a full 360° indicator 110 or at least 270°), is that the tightness of the nut 102 can be easily seen from various angles. In some scenarios, the fitting assembly 100, the first component 152, and the second component 154 might be located at a hard to reach or hard to view location in an environment (e.g., on an aircraft). Thus, having a plurality of through-holes can make the fitting assembly 100 adaptable for use in various environments and can help an inspector see whether the indicator 110 is visible through at least one through-hole of the plurality when at least one other through-hole of the plurality might be obstructed from view by other objects in the environment. These advantages can also be achieved with less through-holes and where the indicator 110 has a different shape than that shown in the examples herein.

In use, the first component 152 can be inserted into the threaded end of the nut 102 (i.e., the opening at the threaded portion 104 of the nut 102) until the flange 156 engages with the indicator 110. An end of the first component 152 can then be inserted partially into an opening located at the end of the second component 154 that has the threaded section 158. Before the nut 102 is tightened, the spring 114 is in an uncompressed state and the indicator 110 rests between the flange 156 and the spring 114. As the nut 102 is then tightened, the threaded section 158 of the second component 154 engages the threaded portion 104 of the nut 102 and the flange 156 pushes the indicator 110, which compresses the spring 114 between the indicator 110 and the retainer assembly 112. Due to the position of the plurality of through-holes and the movement of the indicator 110, the surface 116 of the indicator 110 thus becomes less visible through the plurality of through-holes as the nut 102 is rotated.

FIG. 5 depicts another side view and another cross-sectional side view of the fitting assembly 100. Specifically, FIG. 5 depicts the fitting assembly 100 after the nut 102 has been rotated and tightened to couple the first component 152 to the second component 154. As shown, the surface 116 of the indicator 110 is no longer visible through the plurality of through-holes, which might indicate to an inspector that the nut 102 is sufficiently tightened.

In alternative examples, the fitting assembly 100 can be configured such that, when the nut 102 is rotated, a visibility of the indicator 110 changes in a different way than the example shown in FIGS. 4 and 5. For example, the one or more through-holes 108 can be positioned at a different location (e.g., farther from where the chamber portion 106 borders the threaded portion 104 and closer to the opening of the nut 102 at the chamber portion 106 end of the nut 102). As so arranged, when the nut 102 is rotated, the surface 116 of the indicator 110 will become more visible through the one or more through-holes 108 (e.g., through each of a plurality of through-holes). Other examples are possible as well.

Figure 6:
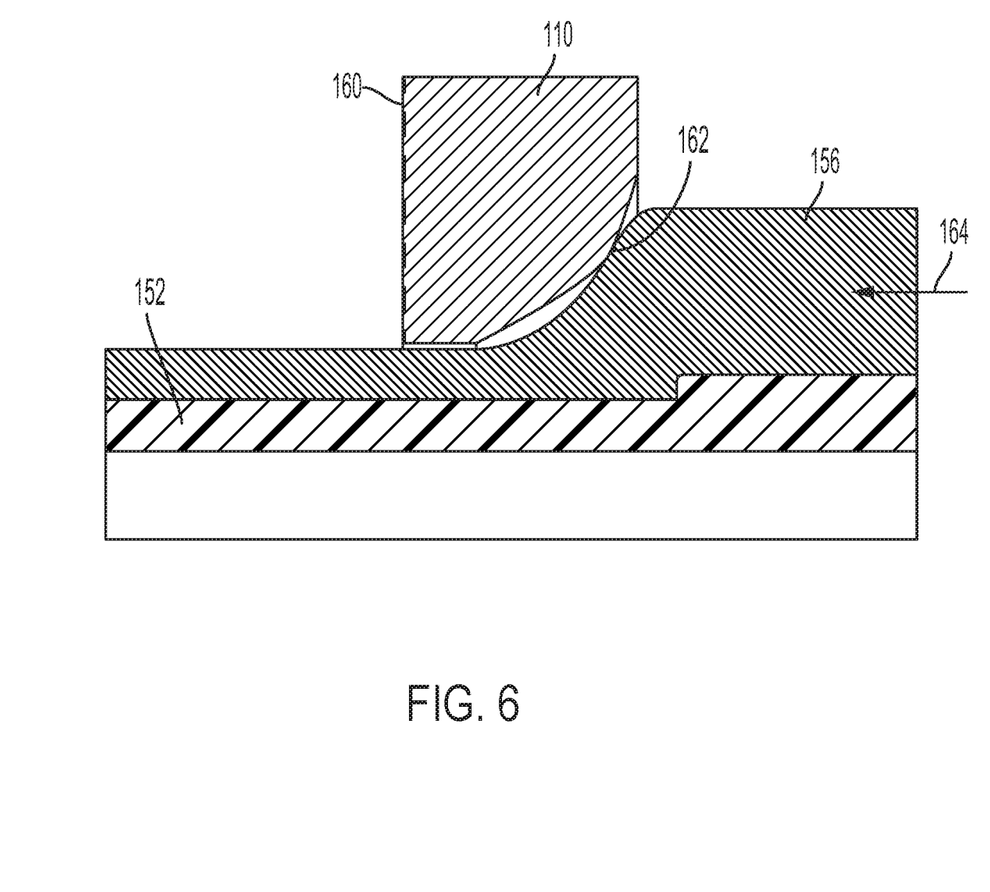
FIG. 6 depicts an indicator of the fitting assembly of FIG. 1 in contact with a first component, according to an example implementation.

FIG. 6 depicts the indicator 110 of the fitting assembly 100 in contact with the flange 156 of the first component 152. In particular, FIG. 6 shows a first surface 160 of the indicator 110 configured to interface with one end of the spring 114 (for simplicity, the spring 114, the nut 102, and other components of the fitting assembly 100 are not shown) and a second surface 162 of the indicator 110 configured to interface with the flange 156 of the first component 152. The second surface 162 is also configured to bear the load caused by a tightening of the nut 102. A representative arrow 164 is shown to indicate the direction of the force applied by torqueing the nut 102. In practice, the indicator 110 can be coated in a lubricant to reduce friction between the indicator 110 and the nut 102 and between the indicator 110 and the first component 152. One reason it can be useful to reduce friction is to reduce or eliminate rotation of the first component 152 and the second component 154. With excessive friction, torqueing of the nut 102 can cause rotation of the first component 152 and the second component 154.

Figure 7:
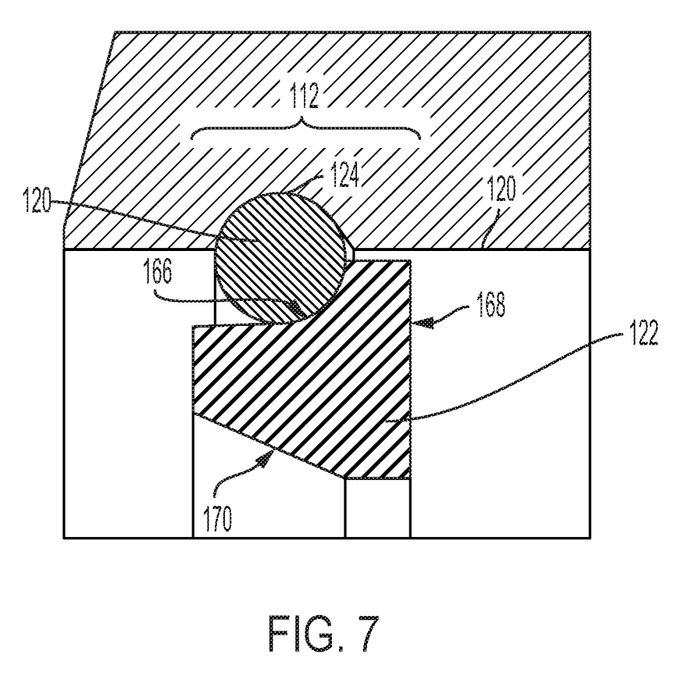
FIG. 7 depicts a retainer assembly of the fitting assembly of FIG. 1, according to an example implementation.

FIG. 7 depicts a zoomed-in view of a portion of the retainer assembly 112 of the fitting assembly 100, specifically a form of the retainer assembly 112 that is comprised of the retainer 122 and the retaining ring 120. As shown, the retainer 122 can include a substantially L-shaped surface 166, a spring interface surface 168, and a chamfered surface 170.

The substantially L-shaped surface 166 can be configured to help retain the retaining ring 120 in the recess 124 in the inner surface 118 of the nut 102. In particular, when a force is exerted on the retainer 122 (e.g., by the spring 114 compressing against the spring interface surface 168), the retainer 122 will also push against the retaining ring 120, which causes the retaining ring 120 to push against the inner surface 118 in the recess 124, thereby locking the retaining ring 120 in the recess 124. Further, the chamfered surface 170 can include a 45° chamfer or a chamfer having a different shape and angle. The chamfered surface 170 can help provide wiggle room for the first component 152 in scenarios where there is intended or unintended flexion of the first component 152.

Figure 8:
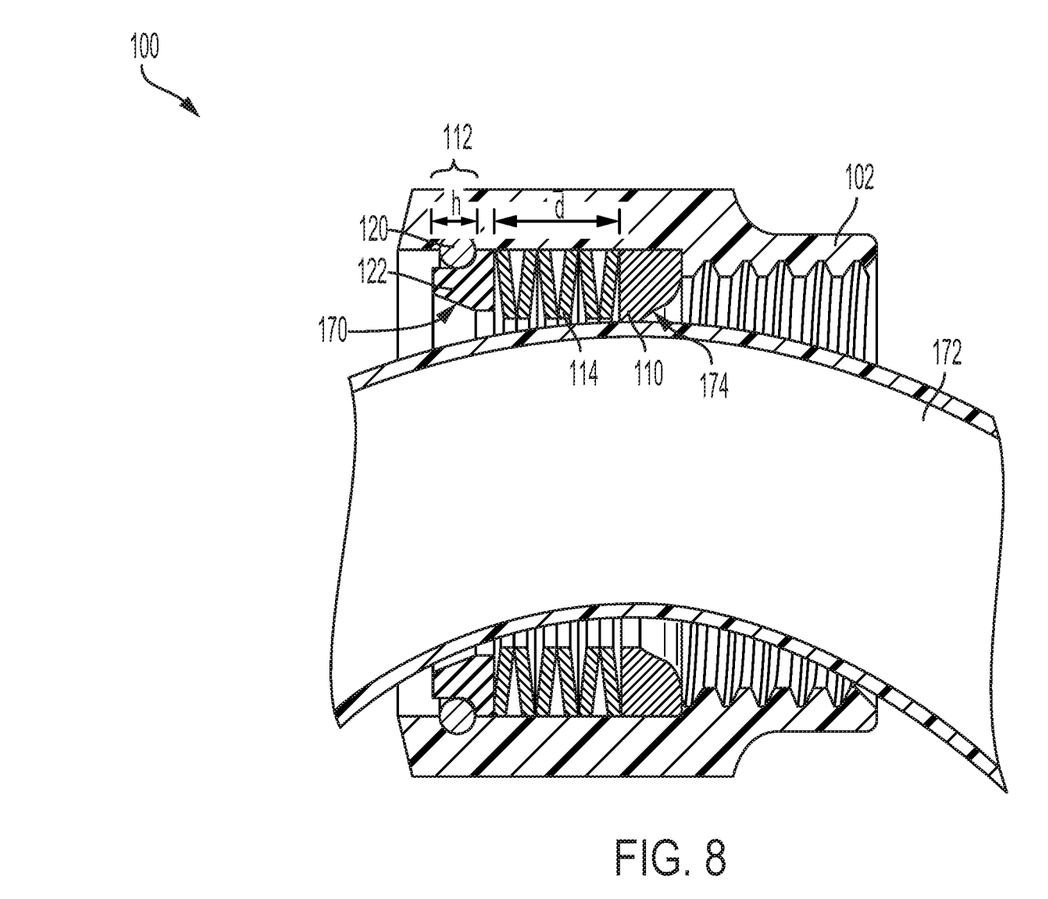
FIG. 8 depicts another cross-sectional side view of the fitting assembly of FIG. 1, according to an example implementation.

FIG. 8 depicts another cross-sectional side view of the fitting assembly 100. In particular, FIG. 8 shows an example bent component 172 that represents a component that can be encircled by, but might exhibit bending within, the fitting assembly 100. In some embodiments, the bent component 172 can be the first component 152. As shown, the design of the retainer 122 and the indicator 110 can provide relief for the bent component 172, thus allowing for the fitting assembly 100 to be used in scenarios where one or both of the components that are being coupled might flex and bend. As noted above, the chamfered surface 170 of the retainer 122 can accomplish this. Additionally or alternatively, and as shown in FIG. 8, the indicator 110 can include a chamfered surface 174 as well for the same purpose.

Furthermore, FIG. 8 also illustrates a height, h, of the portion of the retainer 122 having the substantially L-shaped surface 166 and a displacement, d, of the spring 114. In some embodiments, the displacement of the spring 114 should be greater than or equal to the height of the retainer 122 to assemble the fitting assembly 100. More particularly, the spring 114 must be compressed at least by a dimension of h in order for the retainer 122 to be displaced far enough into the chamber portion 106 to insert the retaining ring 120.

Figure 9:
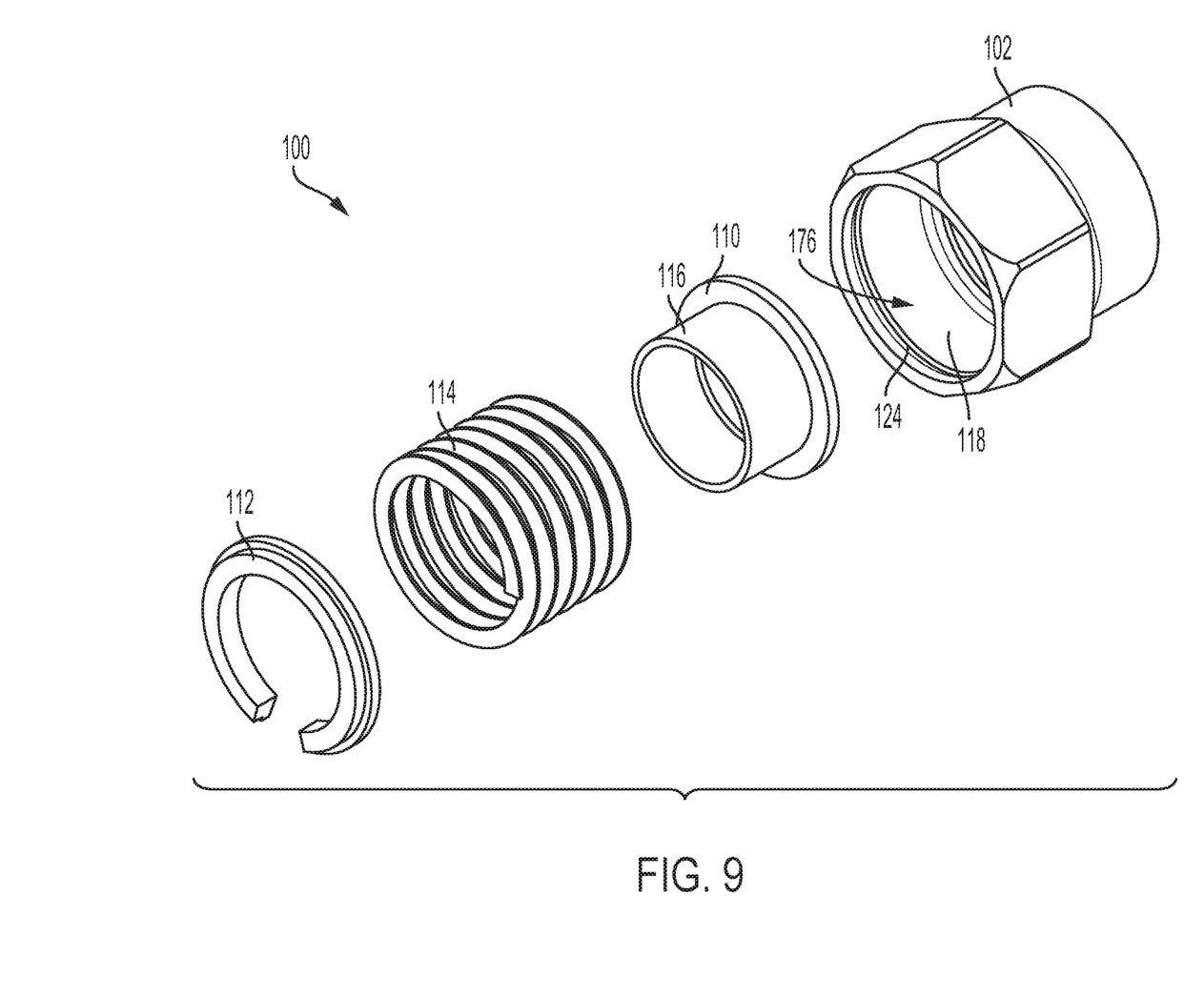
FIG. 9 depicts an exploded view of another example of a fitting assembly, according to an example implementation.
Figure 10:
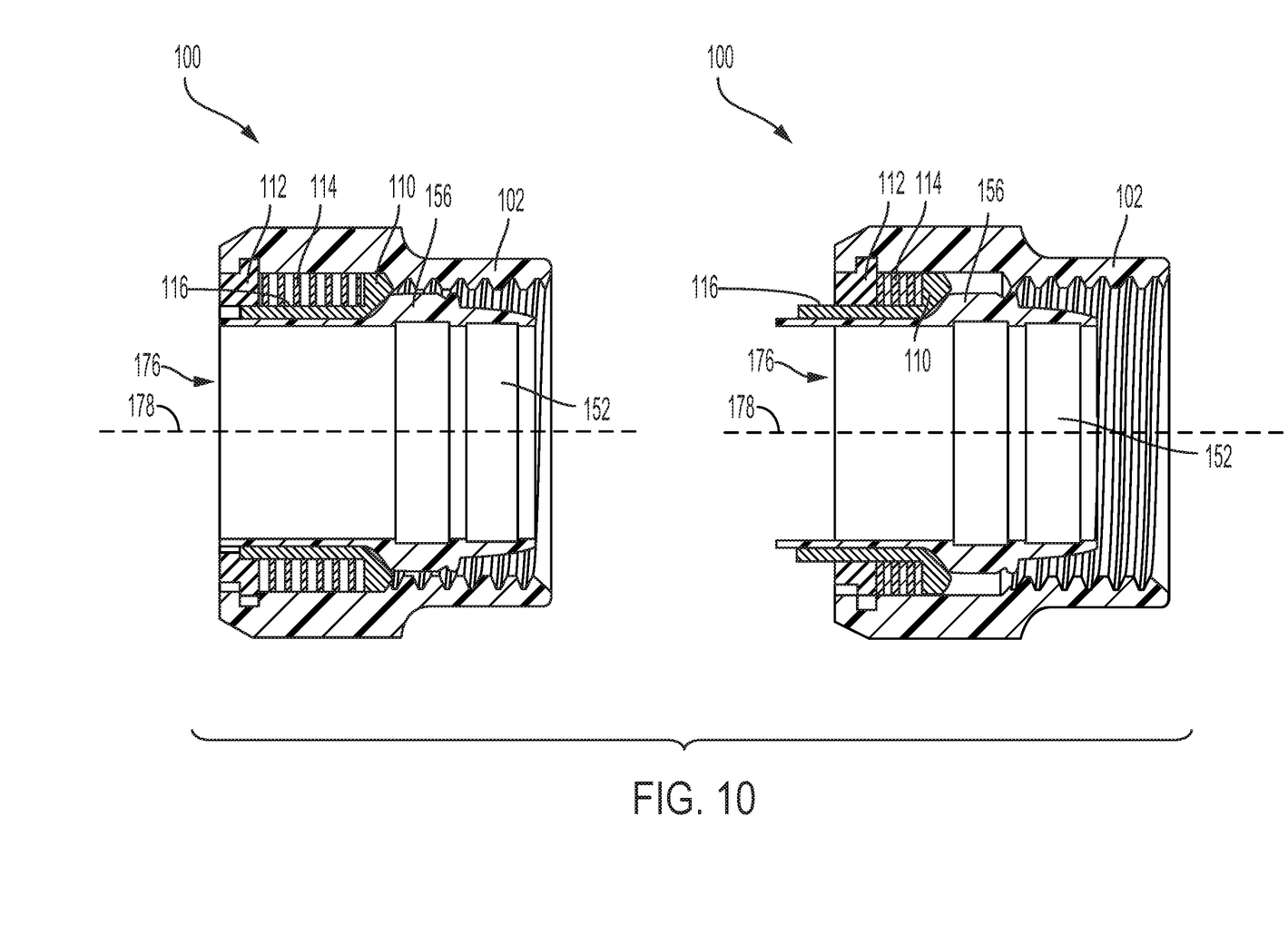
FIG. 10 depicts a cross-sectional side view of the fitting assembly of FIG. 9 being used to couple a first component to a second component, according to an example implementation.

Next, FIGS. 9 and 10 each relate to an alternative example of the fitting assembly 100. As shown in FIGS. 9 and 10, some of the above-described components of the fitting assembly 100 can take alternative forms that together provide another manner in which tightness of the nut 102 can be visibly indicated.

FIG. 9 depicts an exploded view of the alternative example of the fitting assembly 100. As shown, the indicator 110 has a cylindrical portion and a flange, where the cylindrical portion has a radius that is smaller than a radius of the spring 114 and the retainer assembly 112, so as to allow the indicator 110 to protrude out of an opening 176 of the nut 102 as the nut 102 is rotated. In this example, the cylindrical portion of the indicator 110 is the surface 116 of which a visibility changes when the nut 102 is rotated. As further shown, the retainer assembly 112 takes the form of a snap ring, although in alternative examples a retainer and retaining ring could be used. And as further shown, the nut 102 does not include the one or more through-holes 108 shown in FIGS. 1-5. However, in alternative examples, the nut 102 can include the one or more through-holes 108 which, in combination with the indicator 110 shown in FIG. 9, can provide a visual indication of a tightness of the nut 102 (e.g., when tight, the surface 116 might protrude out of the opening 176, but might not be visible through the one or more through-holes 108).

FIG. 10 depicts a cross-sectional side view of the alternative example of the fitting assembly 100 being used to couple the first component 152 to the second component 154. For simplicity, the second component 154 is not shown. On the left of FIG. 10, the surface 116 of the indicator 110 is not visible (e.g., not visible when an inspector is viewing the fitting assembly 100 from the side, which can occur in practice), and on the right of FIG. 10, the surface 116 is visible after the nut 102 has been rotated. Specifically, the cylindrical portion of the indicator 110 can be configured to have a length such that the surface 116 does not protrude out of the opening 176 when the nut 102 has not been tightened to a desired degree. Thus, when the nut 102 is rotated, the flange 156 pushes the indicator 110, which compresses the spring 114 between the indicator 110 and the retainer assembly 112 and pushes the surface 116 in a direction parallel to the longitudinal axis 178 of the nut 102 such that the indicator 110 protrudes out of the opening 176 and becomes more visible.

The above-described advantages and visual indication of nut tightness can also be accomplished in various possible alternative examples of the fitting assembly 100, such as examples that include more or less components than the examples illustrated in FIGS. 1-10.

Figure 11:
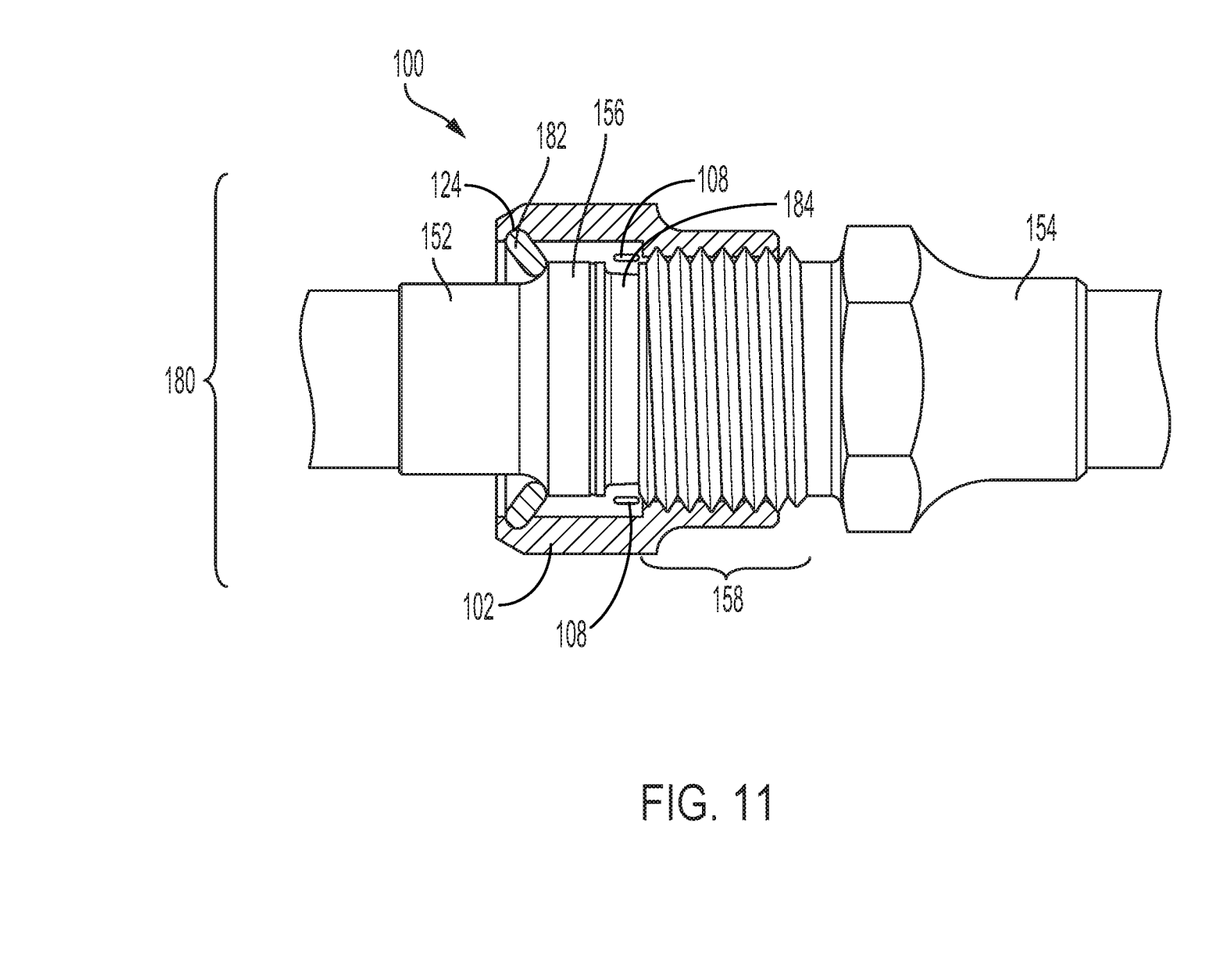
FIG. 11 depicts another example of a fitting assembly used to couple a first component to a second component, according to an example implementation.

FIG. 11, for example, is another example of a system 180 that includes the first component 152, the second component 154, and another alternative example of the fitting assembly 100. As shown in FIG. 11, the fitting assembly 100 includes the nut 102 (in which the one or more through-holes 108 are disposed) and a washer 182 sized and positioned to engage the recess 124 disposed in the inner surface 118 of the nut 102 as well as to engage the flange 156 of the first component 152. Engaged with the recess 124 and the flange 156 in this manner, the washer 182 can retain a portion of the first component 152 within the nut 102 (e.g., prevent the first component 152 from being pushed out from within the nut 102 during tightening of the nut 102). The washer 182 can be made of metal, plastic, and/or another material, and can take various forms, such as a spring washer (e.g., Belleville washer, wave washer, etc.) or other type of washer.

In the embodiment shown in FIG. 11, as well as in other embodiments where the fitting assembly 100 might not include a separate physical component as an indicator, the indicator of tightness of the nut 102 can take various forms. For example, at least a portion of the second component 154 (e.g., the threaded section 158) can be configured (e.g., painted, manufactured, etc.) with a surface that acts as an indicator whose visibility changes through the one or more through-holes 108 when the nut 102 is tightened. As another example, at least a portion of the first component 152 can be configured (e.g., painted, manufactured, etc.) with a surface that acts as an indicator whose visibility changes through the one or more through-holes 108 when the nut 102 is tightened. For instance, as shown in FIG. 11, an outer surface 184 of the first component 152 adjacent to the flange 156 can be color coated or coated/manufactured in another way described above such that the outer surface 184 is visible to an inspector through the one or more through-holes 108 before the nut 102 is tightened, but becomes less visible as the nut 102 is tightened due to movement of the one or more through-holes 108 with respect to the location of the outer surface 184. Alternatively, depending on the location of the outer surface 184 and/or the one or more through-holes 108, the outer surface 184 might become more visible through the one or more through-holes 108 as the nut 102 is tightened. Other examples are possible as well.

Figure 12:
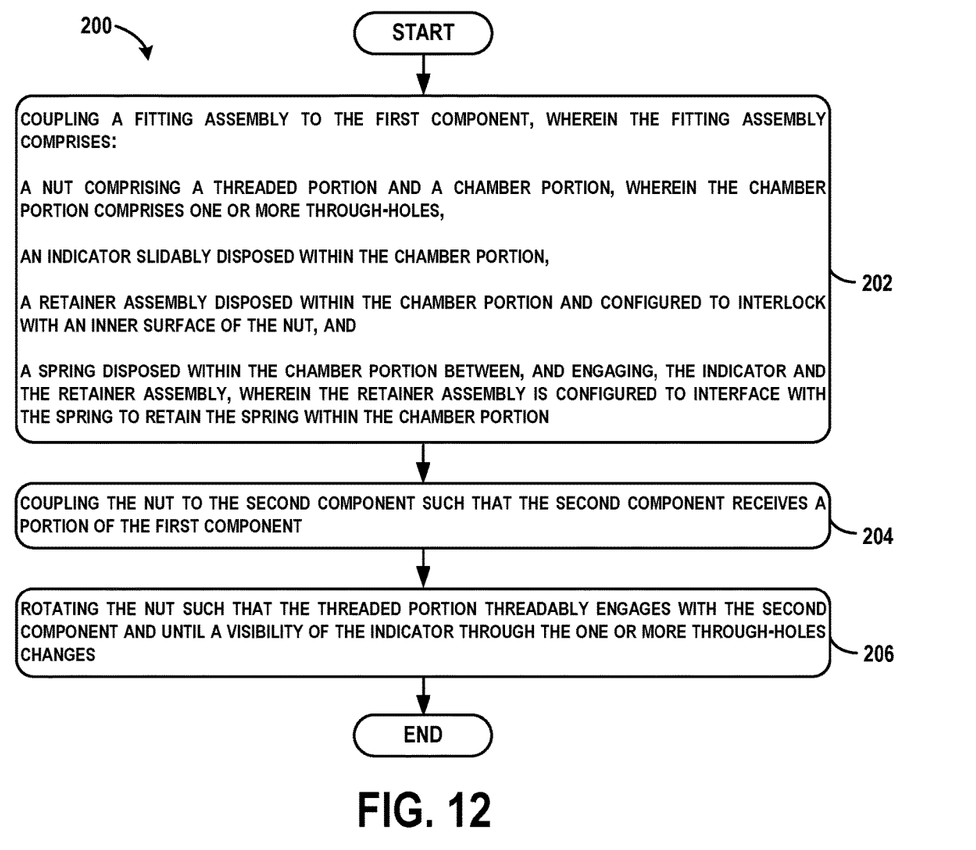
FIG. 12 shows a flowchart of an example method for coupling a first component to a second component, according to an example implementation.

FIG. 12 shows a flowchart of an example of a method 200 that could be used with the fitting assembly 100 shown in FIGS. 1, 2, 3, 4, 5, 6, 7, and 8, or the fitting assembly shown in FIGS. 9, 10, and 11, particularly for using such a fitting assembly for coupling a first component to a second component such that nut tightness is visibly indicated. Method 200 may include one or more operations, functions, or actions as illustrated by one or more of blocks 202-206.

At block 202, the method 200 includes coupling a fitting assembly to the first component, where the fitting assembly comprises a nut comprising a threaded portion and a chamber portion, where the chamber portion comprises one or more through-holes, where the fitting assembly comprises an indicator slidably disposed within the chamber portion, where the fitting assembly comprises a retainer assembly disposed within the chamber portion and configured to interlock with an inner surface of the nut, where the fitting assembly comprises a spring disposed within the chamber portion between, and engaging, the indicator and the retainer assembly, where the retainer assembly is configured to interface with the spring to retain the spring within the chamber portion.

At block 204, the method 200 includes coupling the nut to the second component such that the second component receives a portion of the first component.

At block 206, the method 200 includes rotating the nut such that the threaded portion threadably engages with the second component and until a visibility of the indicator through the one or more through-holes changes.

Figure 13:
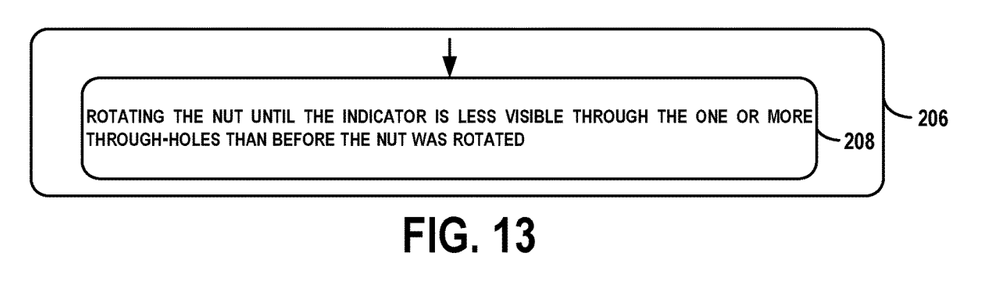
FIG. 13 shows a flowchart of an example method for performing the rotating function of the method of FIG. 12, according to an example implementation.

FIG. 13 shows a flowchart of an example method for performing the rotating as shown in block 206. At block 208, functions include rotating the nut until the indicator is less visible through the one or more through-holes than before the nut was rotated.

Figure 14:
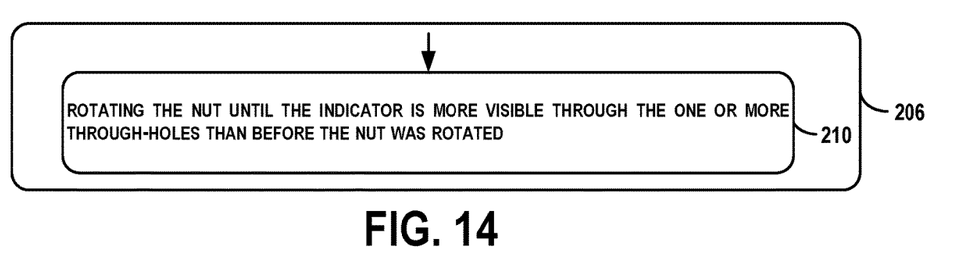
FIG. 14 shows a flowchart of another example method for performing the rotating function of the method of FIG. 12, according to an example implementation.

FIG. 14 shows a flowchart of another example method for performing the rotating as shown in block 206. At block 210, functions include rotating the nut until the indicator is more visible through the one or more through-holes than before the nut was rotated.

Figure 15:
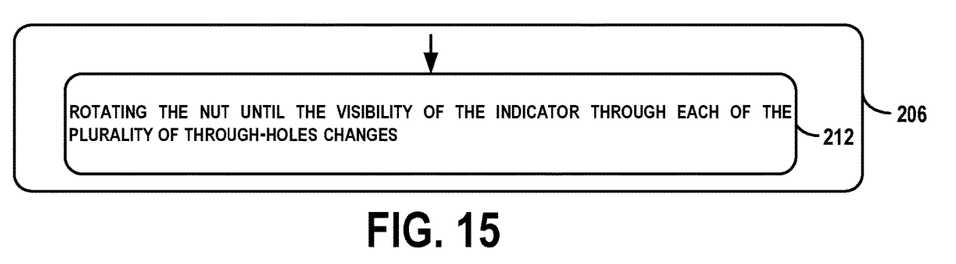
FIG. 15 shows a flowchart of another example method for performing the rotating function of the method of FIG. 12, according to an example implementation.

FIG. 15 shows a flowchart of another example method for performing the rotating as shown in block 206, particularly in an embodiment where the one or more through-holes comprises a plurality of through-holes, and where the indicator is annular. At block 212, functions include rotating the nut until the visibility of the indicator through each of the plurality of through-holes changes.

Figure 16:
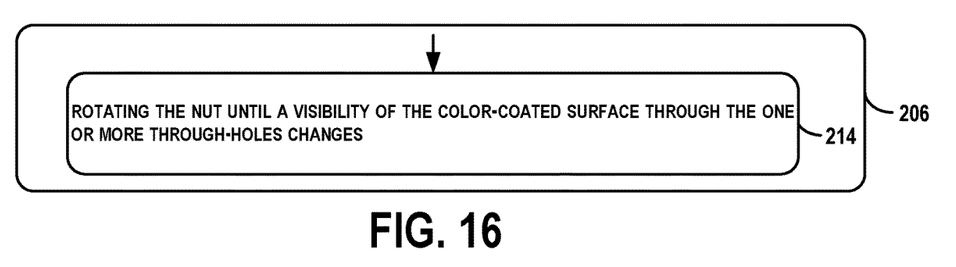
FIG. 16 shows a flowchart of another example method for performing the rotating function of the method of FIG. 12, according to an example implementation.

FIG. 16 shows a flowchart of another example method for performing the rotating as shown in block 206, particularly in an embodiment where the indicator is made of metal and comprises a color-coated surface. At block 214, functions include rotating the nut until a visibility of the color-coated surface through the one or more through-holes changes.

Devices or systems may be used or configured to perform logical functions presented in FIGS. 12, 13, 14, 15, and 16. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Although blocks in FIGS. 12, 13, 14, 15, and 16, are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for these and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIGS. 12, 13, 14, 15, and 16 may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A fitting assembly configured to visibly indicate nut tightness when coupling a first component to a second component, the fitting assembly comprising:
   a nut comprising a threaded portion and a chamber portion, wherein the chamber portion comprises one or more through-holes;
   an indicator slidably disposed within the chamber portion;
   a retainer assembly disposed within the chamber portion and configured to interlock with an inner surface of the nut; and
   a spring disposed within the chamber portion between, and engaging, the indicator and the retainer assembly,
   wherein before the nut is tightened, the indicator is positioned within the nut between the spring and a ledge that projects towards an interior space of the nut,
   wherein the retainer assembly is configured to interface with the spring to retain the spring within the chamber portion, and
   wherein the fitting assembly is configured to receive the first component and the second component such that, when the nut is rotated, a visibility of the indicator through the one or more through-holes changes.

2. The fitting assembly of claim 1, wherein, when the nut is rotated, the spring is compressed between the indicator and the retainer assembly and the indicator becomes less visible through the one or more through-holes.

3. The fitting assembly of claim 1, wherein, when the nut is rotated, the spring is compressed between the indicator and the retainer assembly and the indicator becomes more visible through the one or more through-holes.

4. The fitting assembly of claim 1, wherein the indicator, the retainer assembly, the spring, and the chamber portion are annular and configured to receive the first component, and
   wherein the threaded portion is configured to threadably engage with the second component and receive at least a portion of the first component.

5. The fitting assembly of claim 1, wherein the indicator is configured for engagement with, and positioning between, the spring and a flange of the first component.

6. The fitting assembly of claim 1, wherein the indicator is coated in a lubricant configured to reduce friction between the indicator and the nut and between the indicator and the first component.

7. The fitting assembly of claim 1, wherein the one or more through-holes comprises a plurality of through-holes, wherein the indicator is annular, and
   wherein the fitting assembly is configured to receive the first component and the second component such that, when the nut is rotated, a visibility of the indicator through each of the plurality of through-holes changes.

8. The fitting assembly of claim 1, wherein the indicator is made of metal and comprises a color-coated surface, and
   wherein, when the nut is rotated, a visibility of the color-coated surface through the one or more through-holes changes.

9. The fitting assembly of claim 1, wherein the retainer assembly comprises a retaining ring and a retainer,
   wherein the retaining ring is configured to engage with the retainer and a recess disposed in the inner surface of the nut to retain the retainer within the chamber portion, and
   wherein the retainer is configured to interface with the spring to retain the spring within the chamber portion.

10. A method for coupling a first component to a second component, the method comprising:

coupling a fitting assembly to the first component, wherein the fitting assembly comprises:
- a nut comprising a threaded portion and a chamber portion, wherein the chamber portion comprises one or more through-holes,
- an indicator slidably disposed within the chamber portion,
- a retainer assembly disposed within the chamber portion and configured to interlock with an inner surface of the nut, and
- a spring disposed within the chamber portion between, and engaging, the indicator and the retainer assembly, wherein the retainer assembly is configured to interface with the spring to retain the spring within the chamber portion;

coupling the nut to the second component such that the second component receives a portion of the first component; and rotating the nut such that the threaded portion threadably engages with the second component and until a visibility of the indicator through the one or more through-holes changes.

11. The method of claim 10, wherein rotating the nut until the visibility of the indicator through the one or more through-holes changes comprises rotating the nut until the indicator is less visible through the one or more through-holes than before the nut was rotated.

12. The method of claim 10, wherein rotating the nut until the visibility of the indicator through the one or more through-holes changes comprises rotating the nut until the indicator is more visible through the one or more through-holes than before the nut was rotated.

13. The method of claim 10, wherein the one or more through-holes comprises a plurality of through-holes,
wherein the indicator is annular, and
wherein rotating the nut until the visibility of the indicator through the one or more through-holes changes comprises rotating the nut until the visibility of the indicator through each of the plurality of through-holes changes.

14. The method of claim 10, wherein the indicator is made of metal and comprises a color-coated surface, and
wherein rotating the nut until the visibility of the indicator through the one or more through-holes changes comprises rotating the nut until a visibility of the color-coated surface through the one or more through-holes changes.

15. A system comprising:
a first component;
a second component; and
a fitting assembly configured to visibly indicate nut tightness when coupling the first component to the second component, the fitting assembly comprising:
- a nut comprising a threaded portion and a chamber portion, wherein the chamber portion comprises one or more through-holes,
- an indicator slidably disposed within the chamber portion,
- a retainer assembly disposed within the chamber portion and configured to interlock with an inner surface of the nut, and
- a spring disposed within the chamber portion between, and engaging, the indicator and the retainer assembly, wherein the retainer assembly is configured to interface with the spring to retain the spring within the chamber portion, and wherein the fitting assembly is configured to receive the first component and the second component such that, when the nut is rotated, a visibility of the indicator through the one or more through-holes changes.

16. The system of claim 15, wherein the first component is a cylindrical sleeve member comprising a flange configured to engage with the indicator, and
wherein the second component is a cylindrical union comprising a threaded section configured to threadably engage with the threaded portion of the nut and receive at least a portion of the first component.

17. The system of claim 15, wherein, when the nut is rotated, the spring is compressed between the indicator and the retainer assembly and the indicator becomes less visible through the one or more through-holes.

18. The system of claim 15, wherein, when the nut is rotated, the spring is compressed between the indicator and the retainer assembly and the indicator becomes more visible through the one or more through-holes.

19. The system of claim 15, wherein the one or more through-holes comprises a plurality of through-holes,
wherein the indicator is annular, and
wherein the fitting assembly is configured to receive the first component and the second component such that, when the nut is rotated, a visibility of the indicator through each of the plurality of through-holes changes.

20. The system of claim 15, wherein the indicator is made of metal and comprises a color-coated surface, and
wherein when the nut is rotated, a visibility of the color-coated surface through the one or more through-holes changes.

* * * * *